(12) United States Patent
Kitamura et al.

(10) Patent No.: US 10,265,917 B2
(45) Date of Patent: Apr. 23, 2019

(54) DEVICE AND METHOD FOR FORMING SHEET-LIKE RUBBER

(71) Applicant: Toyo Tire & Rubber Co., Ltd., Itami-shi, Hyogo (JP)

(72) Inventors: Takashi Kitamura, Osaka (JP); Hiroshi Ikegami, Osaka (JP)

(73) Assignee: Toyo Tire Corporation, Itami-shi (JP)

( * ) Notice: Subject to any disclaimer, the term of this patent is extended or adjusted under 35 U.S.C. 154(b) by 0 days.

(21) Appl. No.: 15/661,647

(22) Filed: Jul. 27, 2017

(65) Prior Publication Data

US 2017/0320282 A1  Nov. 9, 2017

Related U.S. Application Data

(62) Division of application No. 14/001,973, filed as application No. PCT/JP2012/055395 on Mar. 2, 2012, now Pat. No. 9,751,269.

(30) Foreign Application Priority Data

Mar. 8, 2011   (JP) .................................. 2011-050442

(51) Int. Cl.
  *B29C 47/16*   (2006.01)
  *B29D 30/00*   (2006.01)
  (Continued)

(52) U.S. Cl.
  CPC ...... *B29D 30/0061* (2013.01); *B29C 47/0813* (2013.01); *B29C 47/16* (2013.01);
  (Continued)

(58) Field of Classification Search
  CPC ... B29C 47/0021; B29C 47/16; B29C 47/165; B29C 47/92; B29C 2947/92904; B29C 2947/92628
  (Continued)

(56) References Cited

U.S. PATENT DOCUMENTS 3,850,568 A   11/1974  Bartha
3,947,201 A    3/1976  Ellwood
(Continued)

FOREIGN PATENT DOCUMENTS

JP   08141466 A   6/1996
JP   09-52272 A   2/1997
(Continued)

OTHER PUBLICATIONS

International Search Report dated Apr. 24, 2012, issued in corresponding application No. PCT/JP2012/055395.
(Continued)

*Primary Examiner* — Christina A Johnson
*Assistant Examiner* — Xue H Liu
(74) *Attorney, Agent, or Firm* — Westerman, Hattori, Daniels & Adrian, LLP

(57) ABSTRACT

The sheet-like rubber forming device has a die body which has an opening having a predetermined cross sectional shape, and a variable die lip which is arranged in a front side of the die body and can change the height of the opening. The variable die lip is constructed by a first movable body and a second movable body. The die lip control unit controls the variable die lip so as to drive the first movable body in an opening direction from a state in which the first movable body and the second movable body are closed when the forming is started, hold the positions of the first movable body and the second movable body after reaching a predetermined height, and drive the second movable body in a closing direction when the forming is finished.

2 Claims, 11 Drawing Sheets

(51) Int. Cl.
  *B29C 47/08* (2006.01)
  *B29C 47/36* (2006.01)
  *B29C 47/92* (2006.01)
  *B29D 30/30* (2006.01)
  *B29C 47/38* (2006.01)
  *B29D 30/62* (2006.01)
  *B29C 47/00* (2006.01)
  *B29K 21/00* (2006.01)

(52) U.S. Cl.
  CPC .......... *B29C 47/165* (2013.01); *B29C 47/364* (2013.01); *B29C 47/38* (2013.01); *B29C 47/92* (2013.01); *B29D 30/3007* (2013.01); *B29D 30/62* (2013.01); *B29C 47/0021* (2013.01); *B29C 2947/92628* (2013.01); *B29C 2947/92885* (2013.01); *B29C 2947/92904* (2013.01); *B29D 2030/3078* (2013.01); *B29K 2021/00* (2013.01)

(58) Field of Classification Search
  USPC ........................................................ 425/141
  See application file for complete search history.

(56) References Cited

U.S. PATENT DOCUMENTS 4,944,666 A    7/1990  Hilke et al.
5,458,727 A   10/1995  Meyer

FOREIGN PATENT DOCUMENTS

| JP | 2682872 B2 | 11/1997 |
| JP | 2003-011245 A | 1/2003 |
| JP | 2004-243732 A | 9/2004 |
| JP | 2006123381 A | 5/2006 |

OTHER PUBLICATIONS

Office Action dated Jan. 28, 2015, issued in corresponding Chinese Application No. 2012800119077, w/English translation. (16 pages).

Japanese Office Action dated Aug. 12, 2014, issued in corresponding JP application No. 2011-050442 with English translation (4 pages).

English Translation of the International Preliminary Report on Patentability form PCT/IB/338 dated Sep. 19, 2013 issued in PCT/JP2012/055395 with forms PCT/IB/373 and PCT/ISA/237 (7 pages).

(a)

(b)

(a)

(b)

(a)

(b)

(a)

(b)

(a)

(b)

(a)

(b)

(a)

(b)

(a)

(b)                    (c)

(a)

(b)

DEVICE AND METHOD FOR FORMING SHEET-LIKE RUBBER

CROSS-REFERENCE TO RELATED APPLICATION

This application is a Divisional of co-pending U.S. patent application Ser. No. 14/001,973 filed on Aug. 28, 2013, which is a National Stage of International Application No. PCT/JP2012/055395, filed Feb. 3, 2012, and also claims the benefit of priority of the prior Japanese Patent Application No. 2011-050442, filed on Mar. 8, 2011, the entire contents of which are incorporated herein by reference.

TECHNICAL FIELD

The present invention relates to a sheet-like rubber forming device and method for forming a tire constituting member having a predetermined width and height by extruding a sheet-like rubber from a die head of an extruder.

BACKGROUND ART

As an example of the sheet-like tire constituting member, there is a tread rubber. The sheet-like tire constituting member is tabular in an expanded state as shown in FIG. 6(a), however, when being formed in a tire shape, it is necessary to join an end portion and an end portion on a forming drum. However, if an overlap is generated or a gap is generated when the end portions are joined with each other, uniformity is lowered, and there is a risk that a tire performance is adversely affected (refer to FIGS. 6(b) and 6(c)).

Accordingly, it is necessary to form front and rear end portions of the sheet-like tire constituting member so that a thickness thereof is changed little by little, as shown in FIG. 7(a). As a result, the end portions can be overlapped with each other so that a thickness is entirely uniform, as shown in FIG. 7(b). In order to achieve the formation of the rubber having the shape as mentioned above, there has been a known rubber layer forming method by a variable die head which is disclosed in the following patent document 1.

Specifically, it is disclosed in FIG. 6 of the patent document 1. The variable die head is controlled so as to change a dimension in a width direction of an opening of the die head little by little. Further, in order to form a tread portion which has a comparatively large thickness, the tread portion is formed by overlapping several layers of rubbers each having a small thickness.

PRIOR ART DOCUMENTS

Patent Document

Patent Document 1: JP-A-2004-243732

DISCLOSURE OF THE INVENTION

Problems to be Solved by the Invention

However, the variable die head disclosed in the above patent document 1 has a problem that it takes a long time for forming since several layers of thin rubbers are overlapped as well as a metal mold structure is complicated.

The present invention has been made in view of the above actual condition, and an object thereof is to provide a sheet-like rubber forming device and method in which a metal mold structure is not complicated, and a forming time can be shortened.

Means for Solving the Problems

In order to solve the problem mentioned above, in accordance with the present invention, there is provided a sheet-like rubber forming device for forming a tire constituting member having a predetermined width and height, by extruding a sheet-like rubber from a die head of an extruder, the sheet-like rubber forming device comprising a die body which constructs the die head and has an opening having a predetermined cross sectional shape, a variable die lip which is arranged in a front side of the die body and can change the height of the opening, and a die lip control unit which controls motion of the variable die lip, wherein the variable die lip is constructed by a first movable body which is positioned in one side in a height direction, and a second movable body which is positioned in the other side in the height direction, and wherein the die lip control unit controls the variable die lip so as to drive the first movable body in an opening direction little by little from a state in which the first movable body and the second movable body are closed when the forming is started, hold the positions of the first movable body and the second movable body after reaching a predetermined height, and drive the second movable body in a closing direction little by little when the forming is finished.

A description will be given of an operation and an effect of the sheet-like rubber forming device having the above structure. First of all, the die head is constructed by the die body in an upstream side and the variable die lip in a downstream side. The die body is fixed and has the opening having the predetermined cross sectional shape. In order to vary a height of the opening, the variable die lip is provided with the first movable body and the second movable body. When the forming is started, the first movable body and the second movable body are positioned so as to close the opening. Next, the height of the extruded and formed rubber member is increased little by little from 0 by driving the first movable body in the opening direction little by little. When the first movable body reaches the predetermined height, then the first movable body and the second movable body keep the position for a while. Accordingly, the rubber member having a fixed cross sectional shape is extruded and formed. Further, when the forming is finished, the second movable body is driven and moved toward the closing direction little by little. As a result, the height of the extruded and formed rubber member heads for 0 little by little. The tire constituting member having the shape as shown in FIG. 7(b) is formed by controlling the variable die lip in the manner as mentioned above. The structure of the variable die lip only has two movable bodies, and is inhibited from being complicated. Further, since the thin rubber members are not overlapped in layers, it is possible to shorten the forming time. As mentioned above, it is possible to provide the sheet-like rubber forming device in which the metal mold structure is not complicated, and the forming time can be shortened.

In the sheet-like rubber forming device in accordance with the present invention, it is preferable that the sheet-like rubber forming device comprises a gear pump which is arranged in an upstream side of the die head, and a gear pump control unit which controls drive of the gear pump, wherein the gear pump control unit controls the gear pump so as to control a rubber discharge amount from the die body when the control of the variable die lip is carried out by the die lip control unit.

Since the gear pump is provided, it is possible to supply a fixed amount of rubber toward the die head. Further, since the cross sectional shape of the extruded and formed rubber is changed between the forming start time and the forming end time, it is necessary to supply the rubber in conformity to the change of the cross sectional shape. Accordingly, the rubber can be supplied to the die head in conformity to the cross sectional shape of the extruded and formed rubber, by controlling a speed of rotation or the like of the gear pump.

In order to solve the problem mentioned above, in accordance with the present invention, there is provided a sheet-like rubber forming method of forming a tire constituting member having a predetermined width and height by extruding a sheet-like rubber from a die head of an extruder, while using the sheet-like rubber forming device mentioned above, comprising a step of driving the first movable body in an opening direction little by little from a state in which the first movable body and the second movable body are closed, when the forming of the tire constituting member is started, a step of holding the positions of the first movable body and the second movable body after the first movable body reaches a predetermined height, and a step of driving the second movable body in a closing direction little by little when the forming is finished.

The operation and the effect of the sheet-like rubber forming method according to the above structure are already mentioned. In other words, the metal mold structure is not complicated, and the forming time can be shortened.

In the sheet-like rubber forming method in accordance with the present invention, it is preferable that the sheet-like rubber forming method comprises a step of controlling drive of a gear pump which is arranged in an upstream side of the die head, and a step of controlling a discharge amount of the rubber from the die body by controlling the gear pump, at the start time of the forming and the end time of the forming that the control of the variable die lip is carried out.

According to the above structure, as already mentioned, the rubber can be supplied to the die head in conformity to the cross sectional shape of the extruded and formed rubber.

It is preferable to have a step of directly attaching the tire constituting member according to the present invention to the forming drum. As a result, it is possible to shorten the forming step and it is possible to efficiently form the tire constituting member.

MODE FOR CARRYING OUT THE INVENTION

Figure 1:
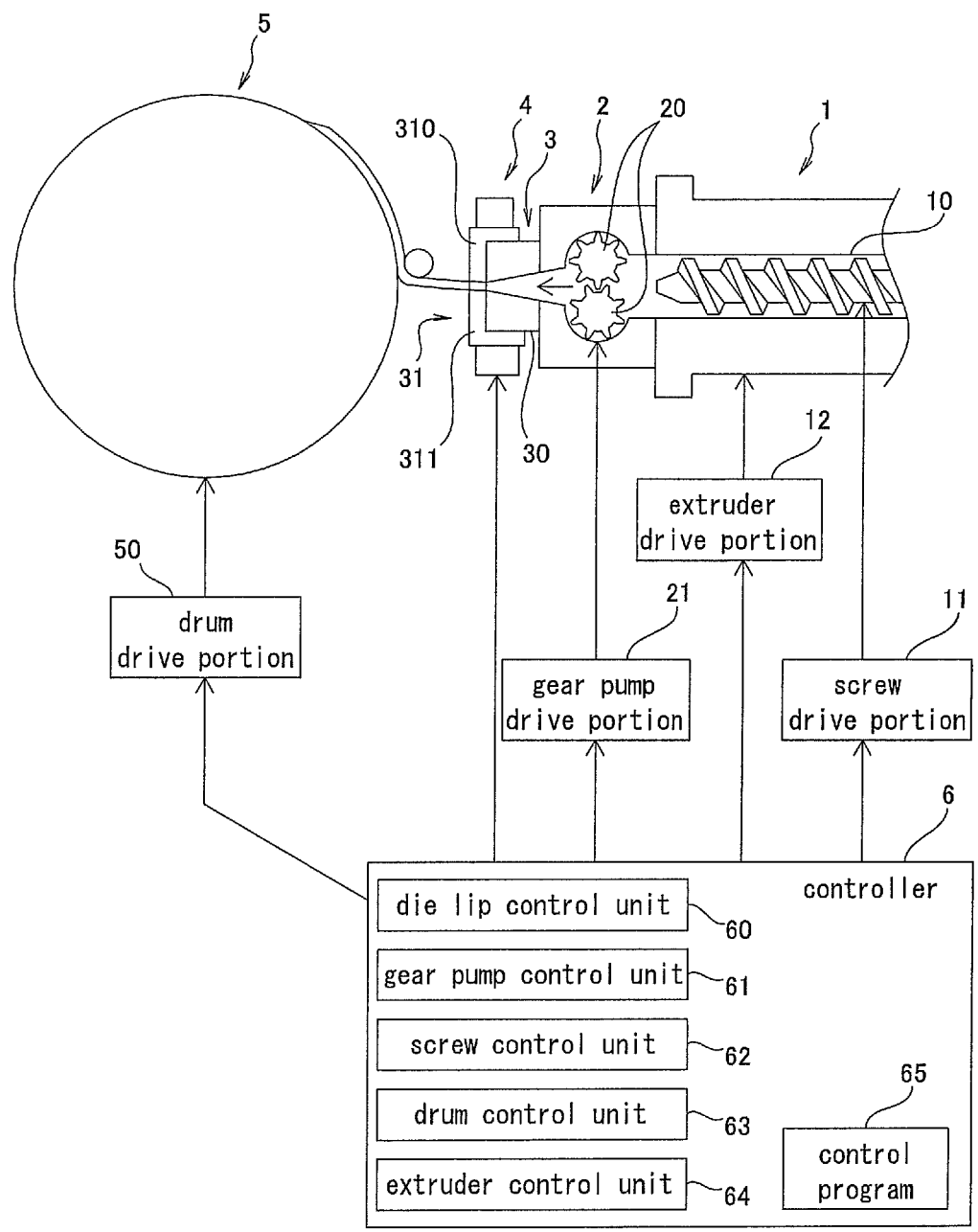
FIG. 1 is a schematic view showing a structure of a sheet-like rubber forming device.

A description will be given of a preferable embodiment of a sheet-like rubber forming device and method according to the present invention with reference to the accompanying drawings. FIG. 1 is a schematic view showing a structure of the sheet-like rubber forming device.

<Structure of Sheet-Like Rubber Forming Device>

In FIG. 1, a sheet-like rubber forming device A is provided with an extruder 1, a gear pump 2 which is arranged in a downstream side of the extruder 1, a die head 3 which is arranged in a downstream side of the gear pump 2, and a movable body drive portion 4 which drives a variable die lip 31 (which will be described later) constructing the die head 3. Further, a forming drum 5 for winding a tire constituting member which constructs the tire is provided.

The extruder 1 is provided with a screw 10 for mixing a rubber which is thrown from a hopper (not shown), and a screw drive portion 11 for rotationally driving the screw 10. The rubber mixed by the screw 10 is fed to the gear pump 2. The gear pump 2 is constructed by a pair of gears 20, and is driven by a gear pump drive portion 21. The gear pump 2 has a function of supplying a fixed amount of rubber to the die head 3 in the downstream side, and can accordingly carry out a stable rubber supply. A supply amount can be defined by controlling a speed of rotation of the gear pump 2.

The die head 3 is constructed by a die body 30 and a variable die lip 31. The die body 30 is provided in its internal portion with a passage for the rubber, and an opening having a predetermined cross sectional shape is formed in the die body. Viewing the die body 30 from a front surface side (a side from which the rubber discharges), a trapezoidal opening 32 is formed. A shape of the opening 32 corresponds to a shape of the tire constituting member to be formed, and a description will be given of an example in which a sheet-like tread portion is formed, in the present embodiment.

The variable die lip 31 is provided in a front side (a downstream side) of the die body 30, and is provided with a first movable body 310 and a second movable body 311. The first and second movable bodies 310 and 311 are driven by the movable body drive portion 4. Details of the variable die lip 31 and the movable body drive portion 4 will be mentioned later.

The rubber extruded from the die head 3 so as to be formed is attached to an outer surface of the forming drum 5. The forming drum 5 is a rotation body having a cylindrical shape, and is driven by a drum drive portion 50.

A controller 6 has a function of controlling motion of each of the portions of the sheet-like rubber forming device A. A die lip control unit 60 controls drive of the variable die lip 31. A gear pump control unit 61 controls a speed of rotation of the gear pump 2. A screw control unit 62 carries out drive control of the screw 10 of the extruder 1. A drum control unit 63 controls a speed of rotation and drive timing or the like of the forming drum 5. An extruder drive portion 12 is a drive portion for moving a whole of the extruder 1, the die head 3 and the movable body drive portion 4 close to and away from the forming drum 5. An extruder control unit 64 controls the extruder 1 or the like so that a distance between the extruder 1 and the forming drum 5 becomes appropriate.

The controller 6 is provided with a computer structure, such as a CPU, and a memory, and control of the controller 6 is carried out based on a control program 65.

<Structure of Die Head>

Figure 2:
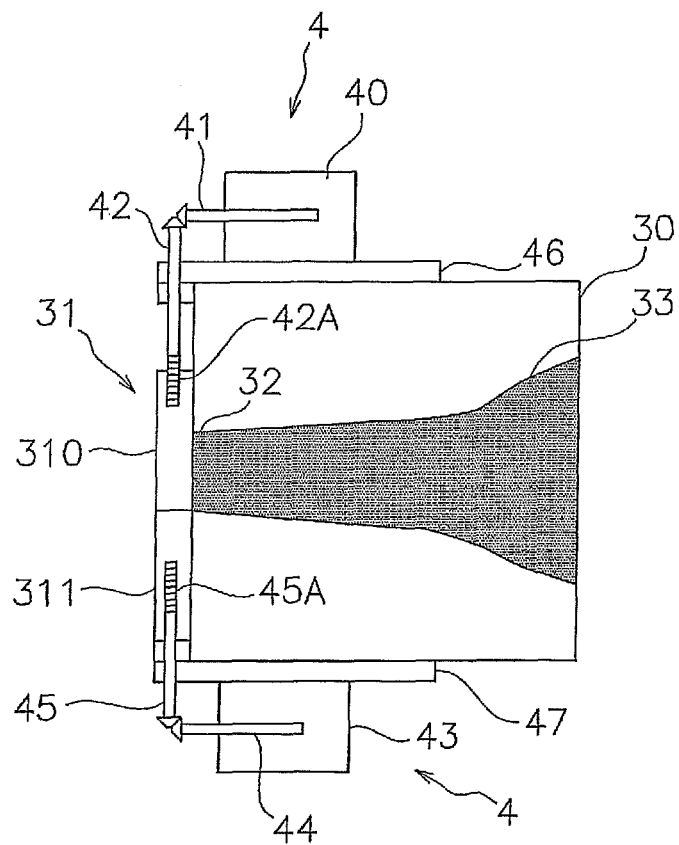
FIG. 2 is a view showing a detailed structure of a die head.
Figure 2:
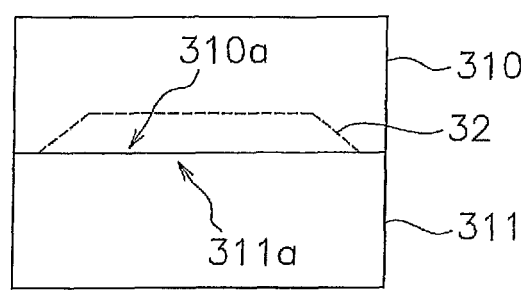
Figure 3:
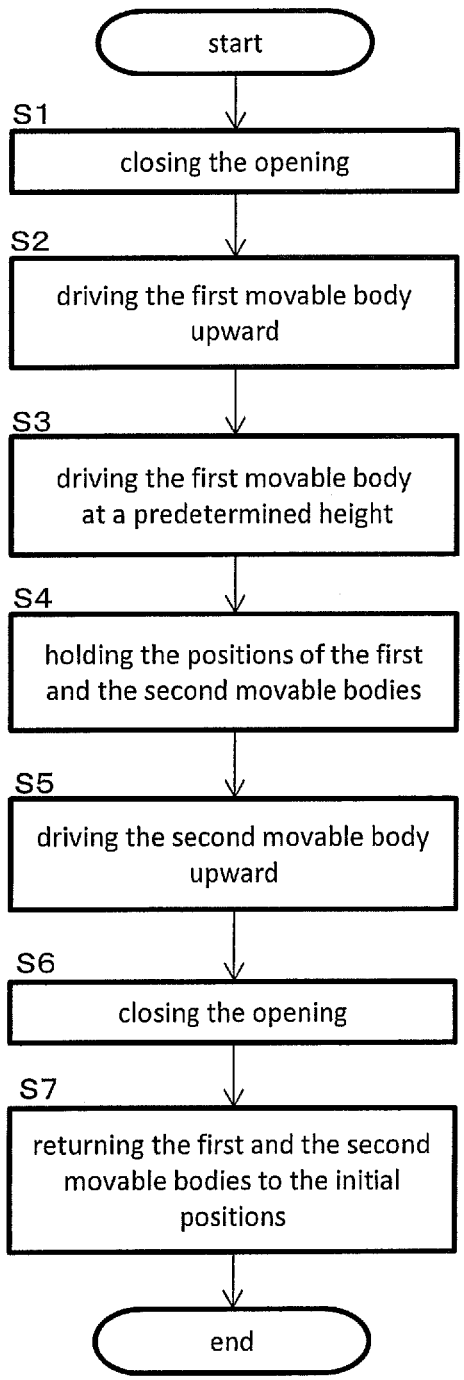
FIG. 3 is a flow chart describing a forming step of a tread rubber which is a tire constituting member.

Next, a description will be given of a detailed structure of the die head 3 with reference to FIG. 2. FIG. 2(*a*) is a side cross sectional view and FIG. 2(*b*) is a front elevational view. As shown in FIG. 2, a flow path 33 in which the rubber flows is provided in an inner portion of the die body 30, and is set such that a cross sectional area becomes smaller little by little from an upstream side in which the gear pump 2 is arranged, toward a downstream side in which the opening 32 is formed.

The variable die lip 31 is provided with the first movable body 310 and the second movable body 311, and is formed as a thick plate shape. The first movable body 310 is driven in a vertical direction in FIG. 2 by a first drive motor 40, a horizontal drive shaft 41 and a vertical drive shaft 42. The horizontal drive shaft 41 and the vertical drive shaft 42 are transmitted their drive by a bevel gear. A drive screw 42 is formed in a lower portion of the vertical drive shaft 42, and is threadably engaged with the first movable body 310. Accordingly, the first movable body 310 can be driven in a vertical direction by driving the first drive motor 40 and turning the vertical drive shaft 42.

The second movable body 311 is driven in a vertical direction in FIG. 2 by a second drive motor 43, a horizontal drive shaft 44 and a vertical drive shaft 45 in the same manner as the first movable body 310. A drive screw 45*a* is formed in an upper portion of the vertical drive shaft 45, and is threadably engaged with the second movable body 311. Accordingly, the second movable body 311 can be driven in a vertical direction by driving the second drive motor 43 and turning the vertical drive shaft 45.

The first drive motor 40 is mounted on a support table 46, and the support table 46 is attached to an upper surface of the die body 30. The second drive motor 43 is mounted on a support table 47, and the support table 47 is attached to a lower surface of the die body 30. The support tables 46 and 47 are provided with bearing functions for the vertical drive shafts 42 and 45.

As shown in FIG. 2(*b*), the opening 32 is formed as the trapezoidal shape as seen from a front surface, and a lower side is longer than an upper side. A lower end portion 310*a* of the first movable body 310 and an upper end portion 311*a* of the second movable body 311 come into contact with each other before starting the forming. Therefore, the opening 32 is in a completely closed state. The opening 32 is exposed by driving the first and second movable bodies 310 and 311 in the vertical direction, and the rubber corresponding to an exposed area is extruded and formed. The first and second movable bodies 310 and 311 are driven only in the vertical direction, and are not driven in a width direction (a lateral direction in FIG. 2).

<Forming Step of Tire Constituting Member>

Next, a description will be given of a forming step of a tread rubber which is the tire constituting member. The description will be given with reference to a flow chart in FIG. 3, and FIGS. 4A to 4F.

Figure 4A:
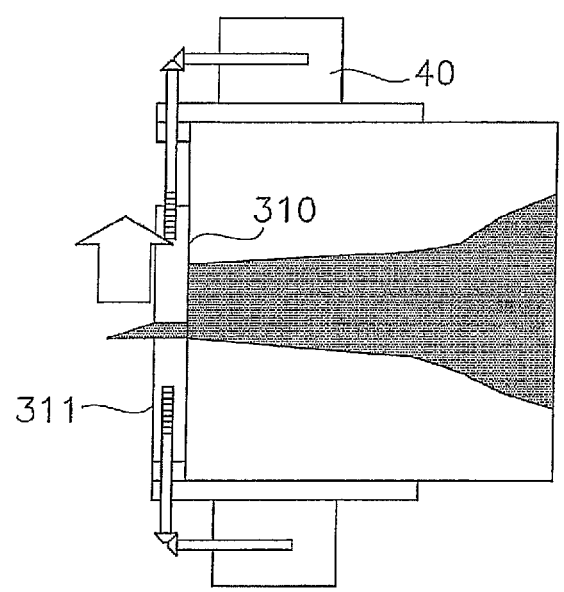
FIG. 4A is a view describing motion of a variable die lip in the forming step.
Figure 4A:
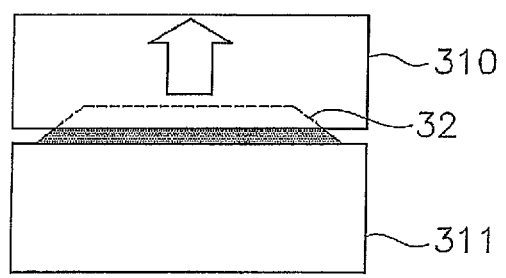
Figure 4B:
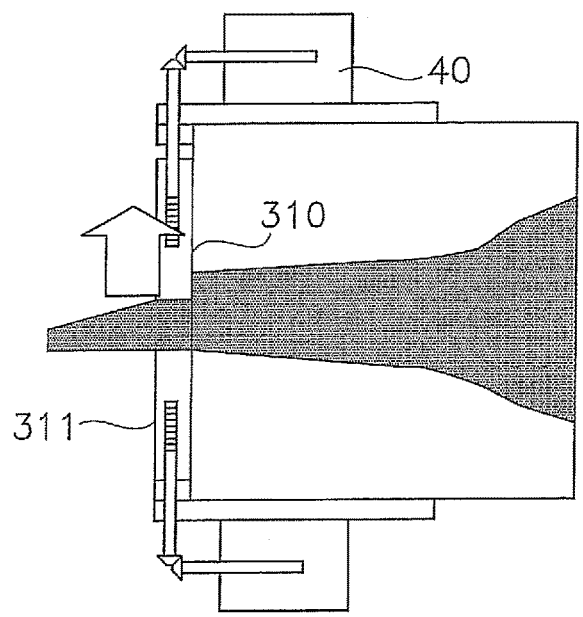
FIG. 4B is a view describing the motion of the variable die lip in the forming step.
Figure 4B:
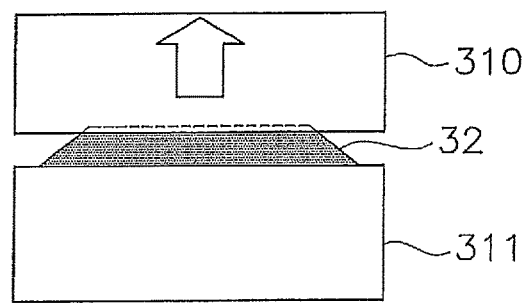

First of all, the variable die lip 31 is set to an initial state shown in FIG. 2. In other words, the first movable body 310 and the second movable body 311 come into contact with each other, and the opening 32 of the die head 3 is closed (S1). Next, the first drive motor 40 is controlled by the die lip control unit 60 of the controller 6, and driving the first movable body 310 upward is started (S2, FIG. 4A). The second movable body 311 is in a fixed state. As a result, the opening 32 is exposed little by little, and the rubber is extruded and formed. A cross sectional shape of the rubber becomes larger little by little (FIG. 4B).

Figure 4C:
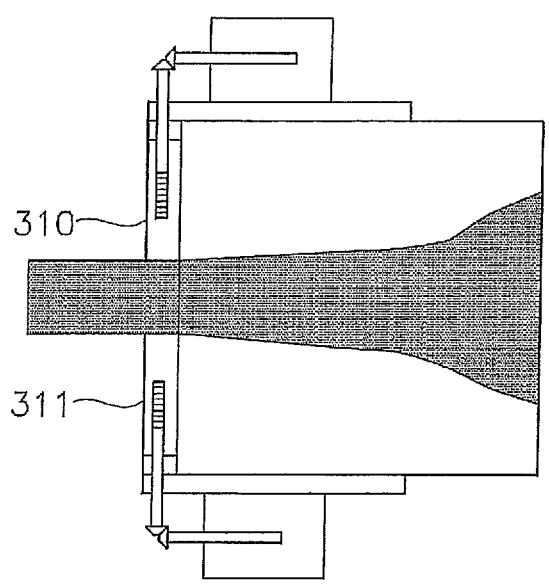
FIG. 4C is a view describing the motion of the variable die lip in the forming step.
Figure 4C:
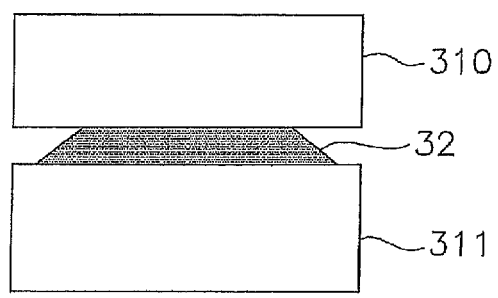
Figure 7:
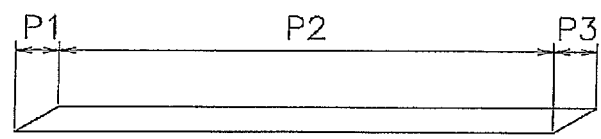
FIG. 7 is a view showing a shape of a sheet-like tire constituting member which solves the problem in FIG. 6.
Figure 7:
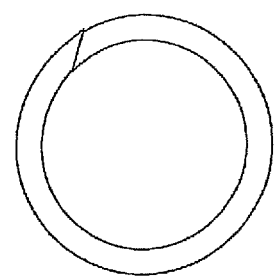

A state in which the first movable body 310 is driven at a predetermined height is shown in FIG. 4C (S3). At this time, the opening 32 is in an approximately exposed state. A stage that the first movable body 310 moves to the predetermined height is defined as a forming start time, and is shown by a reference sign P1 in FIG. 7.

After the first movable body 310 is driven to the predetermined height, the first movable body 310 is held at the position (S4). Further, the second movable body 311 still remains at the initial position. Accordingly, the rubber having a fixed cross sectional shape is extruded and formed thereafter. Specifically, the rubber having the shape of the opening 32 is extruded and formed. This state is defined as a stationary time, and is shown by a reference sign P2 in FIG. 7.

Figure 4D:
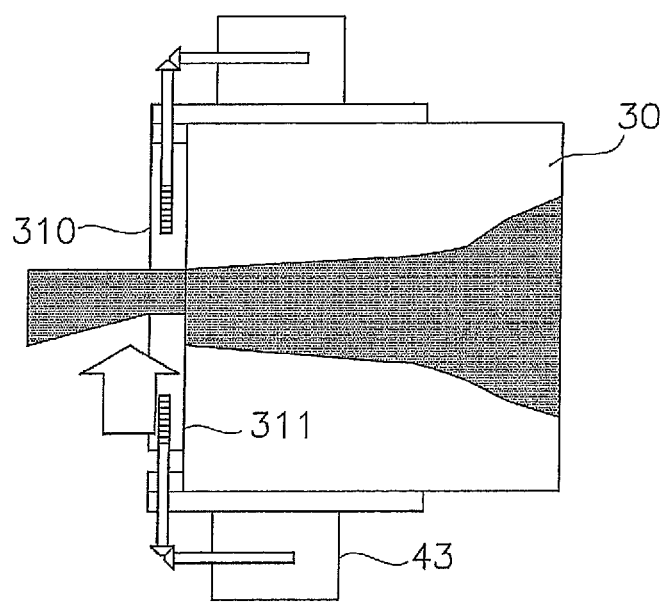
FIG. 4D is a view describing the motion of the variable die lip in the forming step.
Figure 4D:
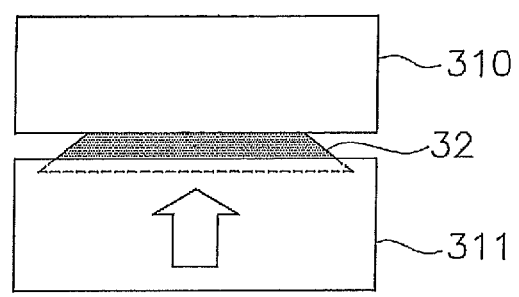
Figure 4E:
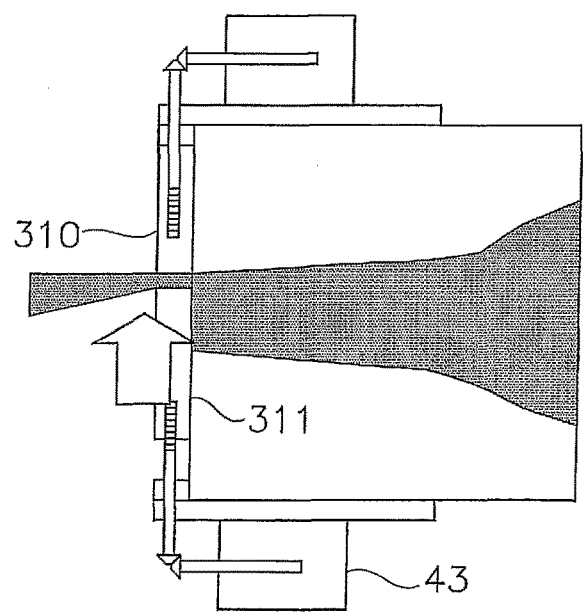
FIG. 4E is a view describing the motion of the variable die lip in the forming step.
Figure 4E:
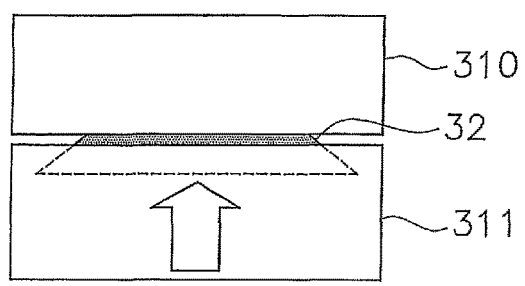

Next, the second drive motor 43 is controlled by the die lip control unit 60 toward the end of the forming, so as to start driving the second movable body 311 upward (S5, FIG. 4D). The first movable body 310 remains stopping in the upward side. As a result, the opening 32 is closed little by little (FIG. 4E).

Discharge of the rubber is finished at a time point that the second movable body 311 moves upward, and the lower end portion 310*a* of the first movable body 310 comes into contact with the upper end portion 311*a* of the second movable body 311 (S6). A section until the second movable body 311 moves upward so as to stop is defined as a forming end time, and is shown by a reference sign P3 in FIG. 7. At this time, the opening 32 comes to a state in which the opening 32 is completely closed, as shown in FIG. 4F.

Figure 4F:
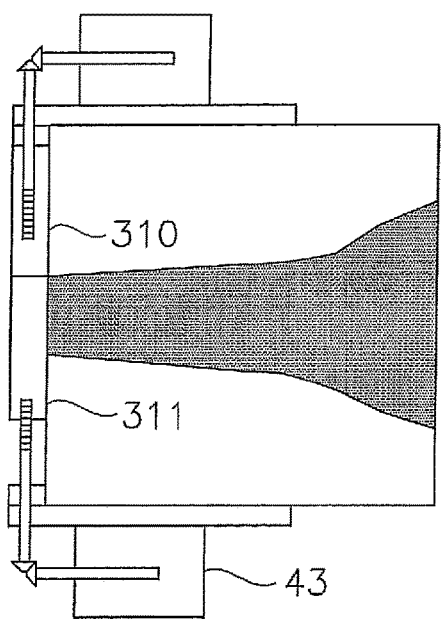
FIG. 4F is a view describing the motion of the variable die lip in the forming step.
Figure 4F:
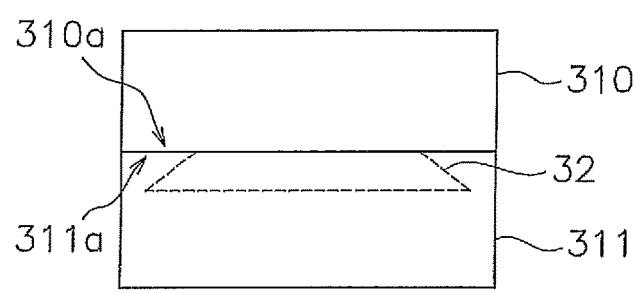

Since both the first movable body 310 and the second movable body 311 are in an upward moving state in the state in FIG. 4F, they are returned to the initial positions shown in FIG. 2 until the next forming of the tire constituting member is started (S7). In other words, the first and second movable bodies 310 and 311 are driven downward by driving both the first drive motor 40 and the second drive motor 43.

Figure 5:
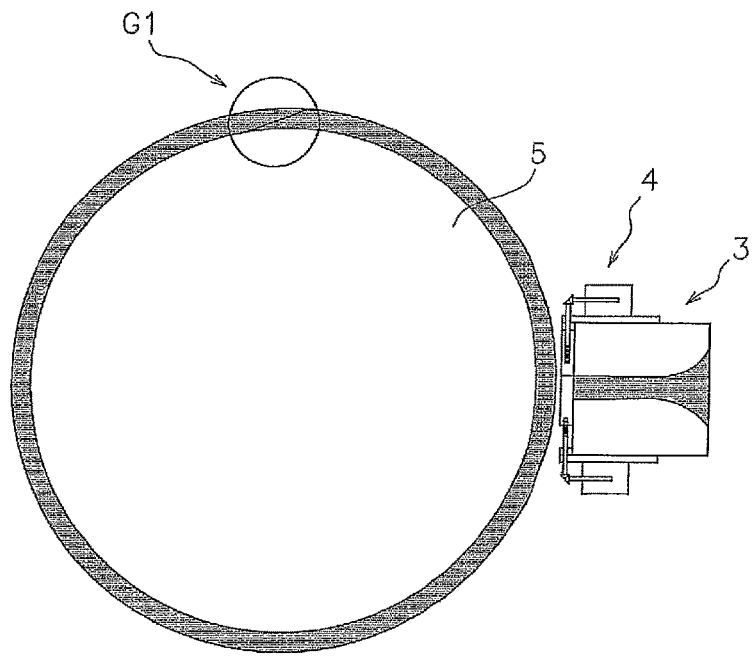
FIG. 5 is a view showing a state of a forming drum and the die head when the forming is finished.
Figure 6:
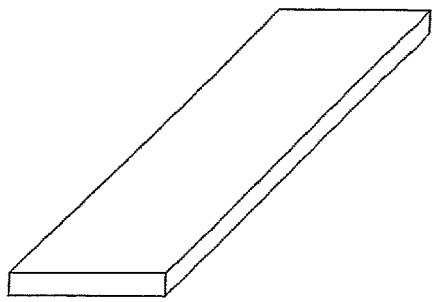
FIG. 6 is a view describing a problem generated at the time of forming a sheet-like tire constituting member.
Figure 6:
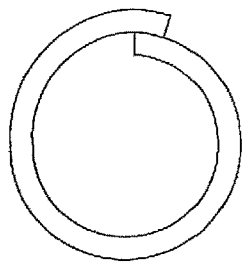
Figure 6:
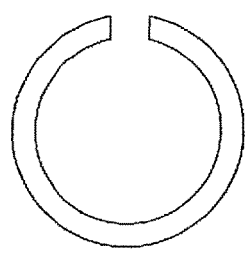

FIG. 5 shows a tire constituting member G in a state in which the tire constituting member is attached to an outer surface of the forming drum 5. A joint portion between end portions of the tire constituting member G is shown by a reference sign G1. According to the forming method of the present invention, since the thickness of the rubber in the end portions becomes thinner little by little, the tire constituting member G having a uniform thickness can be obtained as a whole, by overlapping the end portions.

Next, in the forming step described in FIG. 4, a relative positional relationship between the die head 3 and the forming drum 5 will be described. When the forming is started and the forming is finished, the control is carried out so that the die head 3 comes as close as possible to the forming drum 5. Further, from the start of the forming to the stationary time, the control is carried out so that the distance between the forming drum 5 and the die head 3 becomes longer little by little. Further, at the stationary time, the distance between the forming drum 5 and the die head 3 is kept constant. Further, to the end of the forming, the control is carried out so that the die head 3 again comes close to the forming drum 5. FIG. 5 shows a state in which the die head 3 comes close to the forming drum 5.

Next, a description will be given of a control of the gear pump 2 at the start time of the forming and the end time of the forming. At the start time of the forming and the end time of the forming, the cross sectional shape of the extruded and formed rubber changes little by little. Therefore, it is preferable to change an amount of the rubber which is supplied to the die head 3 from the gear pump 2 while working with the change of the cross sectional shape. Accordingly, at the start time of the forming, the control is carried out so that the speed of rotation of the gear pump 2 is increased little by little. At the stationary time, the rotation of the gear pump 2 is kept at a fixed speed. Further, at the end time of the forming, the control is carried out so that the speed of the rotation of the gear pump 2 is reduced little by little. It is possible to supply an appropriate amount of rubber to the die head 3 by working with the control of the gear pump 2 as mentioned above, and the shape of the extruded and formed rubber can be precisely formed.

It is possible to join so that the joint portion does not generate any step and has a uniform thickness, by using the tire constituting member which is formed by the present invention, and uniformity is improved. Further, in comparison with the forming method according to the strip build which is described in the conventional art, the forming time can be shortened and productivity is exponentially improved.

OTHER EMBODIMENTS

In the present embodiment, the structure using the gear pump is described, however, the present invention can be applied to a case that the gear pump is not provided.

In the present embodiment, the tread portion is exemplified as the tire constituting member, however, the present invention can be applied to a case that the other tire constituting members than the tread portion are formed. Further, with regard to the cross sectional shape of the tire constituting member, various modified examples can be considered, and the cross sectional shape is not limited to the particular shape.

With regard to the drive mechanism of the variable die lip 31, various modified examples can be employed. In the present embodiment, the description was given of the structure in which the opening 32 is closed by the first movable body 310 as shown in FIG. 2, however, a structure in which the opening 32 is closed by the second movable body 311 may be employed. In this case, the second movable body 311 is driven downward so as to open the opening 32 at the start of the forming, and the first movable body 310 is driven downward so as to close the opening 32 at the end of the forming. Accordingly, the moving directions of the first and second movable bodies 310 and 311 when the opening 32 is opened and closed are not limited to the particular directions. A speed when the opening 32 is opened and closed can be appropriately set. In addition, the specific structure of the movable body drive portion 4 can employ various modified examples.

DESCRIPTION OF REFERENCE SIGNS

A sheet-like rubber forming device
G tire constituting member
G1 joint portion
1 extruder
2 gear pump
3 die head
4 movable body drive portion
5 forming drum
6 controller
10 screw
20 gear
30 die body
31 die lip
32 opening
60 die lip control unit
61 gear pump control unit
62 screw control unit
63 drum control unit
64 extruder control unit
310 first movable body
310a lower end portion
311 second movable body
311a upper end portion

What is claimed:

1. A sheet-like rubber forming device for forming a tire constituting member having a predetermined width and height, by extruding a sheet-like rubber from a die head of an extruder, the sheet-like rubber forming device comprising:

a die body which constructs the die head and has an opening having a predetermined cross sectional shape;

a variable die lip which is arranged in a front side of the die body and can change the height of the opening; and a die lip control unit which controls motion of the variable die lip, wherein the variable die lip is constructed by a first movable body which is positioned in one side in a height direction, and a second movable body which is positioned in the other side in the height direction, and wherein the die lip control unit controls the variable die lip so as to drive the first movable body in an opening direction little by little from a state in which the first movable body and the second movable body are closed when the forming is started, hold the positions of the first movable body and the second movable body after reaching a predetermined height, and drive the second movable body in a closing direction little by little when the forming is finished.

2. The sheet-like rubber forming device according to claim 1, further comprising:

a gear pump which is arranged in an upstream side of the die head; and a gear pump control unit which controls drive of the gear pump, wherein the gear pump control unit controls the gear pump so as to control a rubber discharge amount from the die body when the control of the variable die lip is carried out by the die lip control unit.

* * * * *